United States Patent
Öhman et al.

(10) Patent No.: US 12,381,411 B2
(45) Date of Patent: Aug. 5, 2025

(54) CHARGING SYSTEM FOR AN ENERGY STORAGE IN A VEHICLE AND A METHOD FOR CONTROLLING THE CHARGING SYSTEM

(71) Applicant: VOLVO TRUCK CORPORATION, Gothenburg (SE)

(72) Inventors: Mikaela Öhman, Gothenburg (SE); Victor Sandgren, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 902 days.

(21) Appl. No.: 17/644,219

(22) Filed: Dec. 14, 2021

(65) Prior Publication Data
US 2022/0200315 A1   Jun. 23, 2022

(30) Foreign Application Priority Data
Dec. 21, 2020   (EP) ................................... 20216085

(51) Int. Cl.
 *H02J 7/00*   (2006.01)
 *B60L 53/14*   (2019.01)
 *B60L 53/62*   (2019.01)

(52) U.S. Cl.
CPC .......... *H02J 7/00714* (2020.01); *B60L 53/14* (2019.02); *B60L 53/62* (2019.02); *H02J 7/00712* (2020.01);
(Continued)

(58) Field of Classification Search
CPC ............... H02J 7/00714; H02J 7/00712; H02J 7/007182; H02J 7/007192; B60L 53/14; B60L 53/62
(Continued)

(56) References Cited

U.S. PATENT DOCUMENTS

2005/0068005 A1   3/2005   Yamashita
2008/0164849 A1   7/2008   Ciaramitaro
(Continued)

FOREIGN PATENT DOCUMENTS

CN   102762024 A   10/2012
CN   103262198 A   8/2013
(Continued)

OTHER PUBLICATIONS

Non Final Office Action dated Sep. 29, 2024 in corresponding U.S. Appl. No. 17/644,223, 12 pages.
(Continued)

*Primary Examiner* — Zixuan Zhou
(74) *Attorney, Agent, or Firm* — Venable LLP; Jeffri A. Kaminski

(57) ABSTRACT

A charging system for an energy storage in a vehicle comprising: a plurality of parallelly arranged charging switch units, each having an input terminal configured to be connected to a common charging port, and an output terminal configured to be connected to the energy storage, wherein each charging switch unit comprises a contactor configured to control a flow of current from the charging port to the energy storage; for each charging switch unit, a measurement device configured to determine a parameter indicative of a resistance in a current path through the charging switch unit, and a variable resistor configured to control the resistance in the current path; and a charging control unit connected to each of the charging switch units and configured to, if an estimated difference in resistance between any two of the plurality of current paths through a charging switch unit is higher than a predetermined difference threshold value, control the variable resistor of a charging switch unit in the current path having the lowest resistance to increase the resistance of that current path.

15 Claims, 3 Drawing Sheets

(52) U.S. Cl.
CPC .. *H02J 7/007182* (2020.01); *H02J 7/007192* (2020.01)

(58) Field of Classification Search
USPC .......................................................... 320/150
See application file for complete search history.

(56) References Cited

U.S. PATENT DOCUMENTS

| | | | |
|---|---|---|---|
| 2010/0265629 A1 | 10/2010 | Beckerman | |
| 2013/0278269 A1 | 10/2013 | Steck et al. | |
| 2013/0313918 A1 | 11/2013 | Nolewaika | |
| 2014/0217814 A1 | 8/2014 | Namou et al. | |
| 2015/0349387 A1 | 12/2015 | Inaba et al. | |
| 2018/0123362 A1* | 5/2018 | Zheng ................... | H02J 7/0013 |
| 2018/0167013 A1 | 6/2018 | Xu et al. | |
| 2019/0066955 A1 | 2/2019 | Shiozaki et al. | |
| 2020/0086761 A1 | 3/2020 | Hamada et al. | |
| 2020/0189408 A1 | 6/2020 | Ko et al. | |
| 2020/0251292 A1 | 8/2020 | Bobert | |
| 2020/0258706 A1 | 8/2020 | Masuda | |
| 2020/0395780 A1 | 12/2020 | Imanaka | |
| 2021/0018564 A1 | 1/2021 | Takahashi | |

FOREIGN PATENT DOCUMENTS

| | | | |
|---|---|---|---|
| CN | 104221248 | A | 12/2014 |
| CN | 106169619 | A | 11/2016 |
| CN | 106972583 | A | 7/2017 |
| CN | 108081978 | A | 5/2018 |
| CN | 110031753 | A | 7/2019 |
| CN | 110077250 | A | 8/2019 |
| CN | 209230815 | U | 8/2019 |
| CN | 111052530 | A | 4/2020 |
| CN | 111602309 | A | 8/2020 |
| CN | 112018844 | A | 12/2020 |
| DE | 102005035487 | A1 | 2/2007 |
| DE | 102011100151 | A1 | 10/2012 |
| EP | 2963728 | A1 | 1/2016 |
| EP | 3 282 534 | A1 | 2/2018 |
| EP | 3687025 | A1 | 7/2020 |
| JP | 2019118186 | A | 7/2019 |
| KR | 20170071949 | A | 6/2017 |
| WO | 9641358 | A1 | 12/1996 |
| WO | 2020104508 | A1 | 5/2020 |
| WO | 2020184630 | A1 | 9/2020 |

OTHER PUBLICATIONS

European Search Report dated May 27, 2021 in corresponding European Patent Application No. 20216080.0, 6 pages.
Durakool; Contact Resistance Versus Contact Pressure; https://www.durakoolrelays.com/information/technology/contact-resistance-versus-pressure/; 4 pages.
European Search Report dated Jun. 21, 2021 in corresponding European Patent Application No. 20216089.1, 8 pages.
European Search Report dated May 25, 2021 in corresponding European Patent Application No. 20216085.9, 8 pages.
U.S. Ex Parte Quayle Action dated Jun. 20, 2024 in related U.S. Appl. No. 17/644,239, 14 pages.
Notice of Allowance dated Jan. 21, 2025 in corresponding U.S. Appl. No. 17/644,223, 9 pages.
Chinese Office Action dated Mar. 13, 2025 in corresponding Chinese Patent Application No. 202111524542.5, 15 pages.

* cited by examiner

CHARGING SYSTEM FOR AN ENERGY STORAGE IN A VEHICLE AND A METHOD FOR CONTROLLING THE CHARGING SYSTEM

TECHNICAL FIELD

The invention relates to a charging system for controlling charging of an energy storage in an electrical or hybrid vehicle and to a method for controlling such a charging system.

The invention can be applied in heavy-duty vehicles, such as trucks, buses and construction equipment. Although the invention will be described with respect to a truck, the invention is not restricted to this particular vehicle, but may also be used in other applications comprising an energy storage.

BACKGROUND

With the development of electrical and hybrid drive systems for heavy vehicles such as trucks, buses, construction equipment and the like comes requirements for energy storages such as batteries with higher capacity compared to in cars. In particular, the charging of a high capacity energy storage may strain the conventional charging systems used in cars, and the in-vehicle charging configuration may need to be adapted to the high power requirements of heavy vehicles.

Moreover, for heavy vehicles it is even more important to reduce the downtime of the vehicle since trucks, buses and the like are often required to operate for extended periods of time and to have a high availability. Thereby, extended charging times would be a competitive disadvantage when compared to conventional vehicles having a combustion engine.

Accordingly, there is a need to provide charging solutions for heavy vehicles which both can improve the charging properties such as charging time, and which also are able to handle a high charging power.

SUMMARY

In view of the aforementioned desired properties of a charging system for vehicle, it is an object of the present invention to provide a charging system and a method for controlling a charging system for charging an energy storage in an electric or hybrid vehicle.

According to a first aspect of the invention, there is provided a charging system for an energy storage in a vehicle. The charging system comprises: a plurality of parallelly arranged charging switch units, each charging switch unit having an input terminal configured to be connected to a common charging port, and an output terminal configured to be connected to the energy storage, wherein each charging switch unit comprises a contactor configured to control a flow of current from the charging port to the energy storage; for each charging switch unit, a measurement device configured to determine a parameter indicative of a resistance in a current path through the charging switch unit, and a variable resistor configured to control the resistance in the current path; and a charging control unit connected to each of the charging switch units and configured to, if an estimated difference in resistance between any two of the plurality of current paths is higher than a predetermined difference threshold value, control the variable resistor of a charging switch unit in the current path having the lowest resistance to increase the resistance of that current path.

In the described charging system, the charging switch units provide a plurality of parallel charging paths between a charging port and one or more energy storages, thereby allowing a higher power to be provided to the battery compared to if only one charging switch unit would be used. The parallelly arranged charging switch units makes for a modular system where conventional components can be used, and where the total capabilities of the charging system can be easily modified by adjusting the number of parallelly arranged charging switch units. The common charging port is a charging port of the vehicle which is configured to be connected to external charging infrastructure, such as a charging station.

The present invention is based on the realization that in a charging system comprising parallel current paths between the charging port and the battery, there is a need to handle imbalances in the current paths. An imbalance in the current flowing through the different current paths can lead to damage to the charging switch unit and/or to other components in the charging system and it is therefore important to both detect and mitigate such current imbalances.

A potentially harmful imbalance can be detected by observing a parameter indicative of resistance in the current path through a charging switch unit. Based on the observed parameter, a resistance in the current path can be estimated either directly by calculating the resistance or indirectly by employing a known relationship between the measured parameter and the resistance. To determine that there is an imbalance in the system, it is sufficient to detect a difference between any two of the plurality of current paths. Accordingly, in practice, current paths through all charging switch units are monitored and compared to each other to determine if there is an imbalance in the system. The predetermined difference threshold value is preferably set based on the overall system configuration and on the properties of the charging switch units.

Once an imbalance is detected which exceeds the difference threshold value, the variable resistor of the current path having the lowest resistance, i.e. the highest current, can be increased to balance the currents through the charging switch units, thereby preventing damage to the charging switch unit or other components of the charging system.

According to one embodiment of the invention, the measurement device configured to determine a parameter indicative of a resistance may be a current meter or a voltage meter. The measurement device may also be a temperature sensor configured to determine a temperature of the charging switch unit. The current meter may be a commonly arranged current meter for all of the current paths and configured to measure a current through each of the charging switch units, or each charging switch unit may comprise its own current meter and/or a temperature measuring unit. The temperature measuring unit may be any device or unit capable of measuring the temperature of the charging switch unit and should not be limited to any particular temperature measuring technique. It should also be noted that the current meter does not have to be arranged within the charging switch unit as such, it is sufficient that the current meter is arranged to measure a current in the current path for a given charging switch unit.

According to one embodiment of the invention, the charging control unit is further configured control the variable resistor to reduce the current through any charging switch unit having a temperature above a predetermined threshold temperature. Thereby, it can be controlled that none of the charging switch units are above a threshold temperature.

According to one embodiment of the invention, the charging control unit is further configured to control the variable resistor of a charging switch unit only if a current through the charging switch unit is above a predetermined current threshold value. An imbalance in the currents through the charging switch units as such it not necessarily harmful unless the absolute current level reaches a certain level. In other words, an imbalance can be allowed to persist if the absolute current level is sufficiently low. Thereby, even though an imbalance may be indicative of a fault in the charging system requiring system maintenance, an imbalance as such may not be cause for modifying a resistance of a current path through a charging switch unit. Once an imbalance is detected which exceeds the current threshold value, measures can be taken to reduce the current through at least the charging switch unit having the highest current to prevent damage to the charging switch unit.

According to one embodiment of the invention, the charging control unit is further configured to determine a resistance for each current path through a charging switch unit, and if a resistance in any one current path is deviating from resistances in other current paths by more than a predetermined resistance threshold value, to control the variable resistor in the one or more current path with the deviating resistance to equalize the resistance for all current paths. Generally, it is desirable to minimize the resistance of each current path to minimize the thermal losses in the system, meaning that the variable resistors are set at a minimum or zero resistance during normal operating conditions. If so, balancing is achieved by increasing the resistance of selected variable resistors as required. However, in some applications the variable resistors may be set at a non-zero resistance value, in which case balancing could be achieved by decreasing the resistance in one or more current paths as required.

According to one embodiment of the invention, the charging control unit may be configured to select a resistance of one current path as a reference resistance and to compare resistances in the other current paths with the reference resistance. The reference resistance may for example be the current path having the highest or lowest resistance, thereby ensuring that the maximum difference between two current paths can be determined.

According to a second aspect of the invention, there is provided a method for controlling a charging system in a vehicle. The charging system comprises a plurality of parallelly arranged charging switch units, each charging switch unit having an input terminal configured to be connected to a common charging port, and an output terminal configured to be connected to an energy storage, wherein each charging switch unit comprises a contactor configured to control a flow of current from the charging port to the energy storage and a variable resistor configured to control the resistance in a current path through the charging switch unit. The method comprises: determining a resistance for each current path; and if an estimated difference in resistance between any two of the plurality of charging switch units is higher than a predetermined difference threshold value, controlling the variable resistor of a charging switch unit for the current path having the lowest resistance to increase the resistance of that current path.

According to one embodiment of the invention, determining a resistance comprises determining a current through and a voltage over the charging switch unit, and calculating the resistance based on the voltage and current, and/or determining a temperature of the charging switch unit and determining the resistance based on a known relationship between the temperature and resistance for the charging switch unit.

According to one embodiment of the invention, the method further comprises controlling the variable resistor to reduce the current in any charging switch unit having a temperature above a predetermined threshold temperature. The method may also comprise controlling the variable resistor of a charging switch unit having the lowest resistance to increase the resistance for that current path only if the current in the current path having the lowest resistance is above a current threshold value.

According to one embodiment of the invention the method further comprises: determining a resistance for each current path through a charging switch unit; and if a resistance in any one current path is deviating from resistances in other current paths by more than a predetermined threshold value, controlling the variable resistor in the one or more current path with the deviating resistance to equalize the resistance for all current paths. Moreover, the method may further comprise selecting a resistance of one current path as a reference resistance and comparing resistances in the other current paths with the reference resistance.

Further effects and features of this second aspect of the present invention are largely analogous to those described above in connection with the first aspect of the invention.

There is also provided a computer program comprising program code means for performing the steps of any of the aforementioned embodiments when the program is run on a computer, and a computer readable medium carrying a computer program comprising program code means for performing the aforementioned steps.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
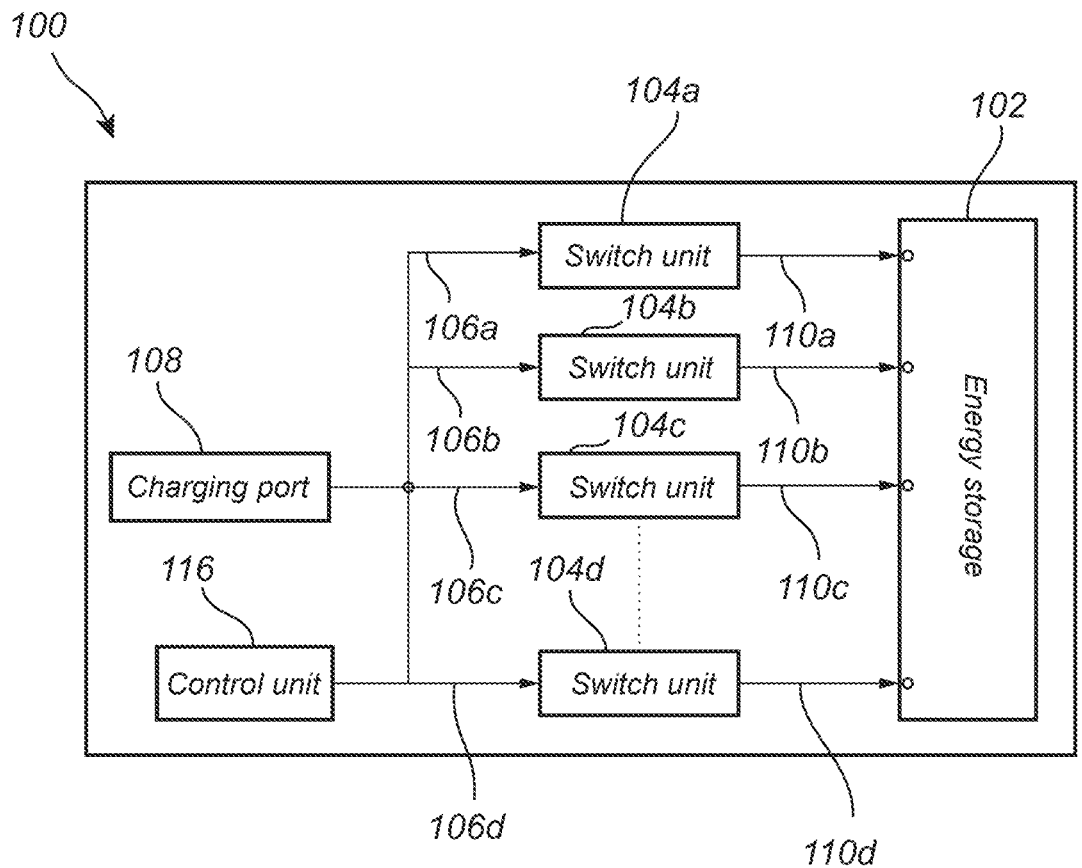
FIG. 1 is a schematic illustration of a charging system according to an embodiment of the invention.

In the present detailed description, various embodiments of a charging system for an energy storage in a vehicle according to the present invention are mainly discussed with reference to a charging system in a truck. It should however be noted that this by no means limits the scope of the present invention since the described invention is equally applicable in other types of vehicles such as cars, buses and construction vehicles. The described charging system may also be used in marine applications such as boats and ships, and in other applications requiring charging at high power levels, for example of a high capacity battery. FIG. 1 schematically illustrates a charging system 100 for an energy storage 102 in a vehicle. The energy storage 102 may be a battery in a truck, and due to the high capacity batteries required to power heavy vehicles it may be required to provide a charging system capable of transferring a high charging power.

Accordingly, the charging system 100 comprises a plurality of parallelly arranged charging switch units 104a-d, each charging switch unit having an input terminal 106a-d configured to be connected to a common charging port 108, and an output terminal 110a-d configured to be connected to the energy storage 102. A charging switch unit 104 is illustrated in further detail in FIG. 2 where it can be seen that the charging switch unit 104 comprises a contactor 200 configured to control a current flow from the charging port 108 to the energy storage 102. The charging switch units 104a-d can be considered to be identical although it would in principle be possible to use charging switch units 104a-d having different properties. However, by using identical charging switch units 104a-d, manufacturing, system assembly and maintenance is simplified since the number of unique components in the system can be kept the same for systems having different power transfer capabilities.

In FIG. 1 the energy storage 102 is illustrated to comprise a plurality of inputs, one for each charging switch unit 104a-d. However, the different current paths via the respective charging switch units 104a-d may equally well be connected to a single input of the energy storage 102, depending on the configuration of the energy storage. In principle, the connection to the energy storage 102 can be configured to suit the specific energy storage 102 used for a given application.

Figure 2:
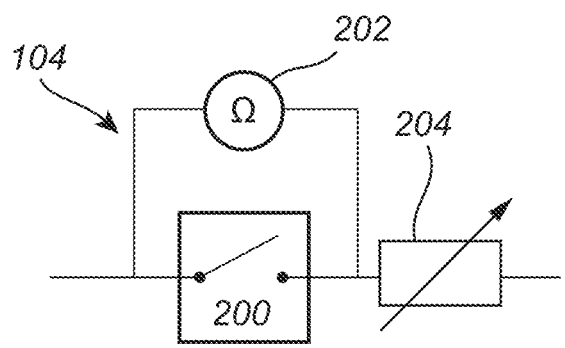
FIG. 2 is a schematic illustration of a charging switch unit of a charging system according to an embodiment of the invention.

The charging system 100 further comprises at least one measurement device 202 configured to determine a parameter indicative of a resistance in a current path through each charging switch unit 104a-d. In FIG. 2, the measurement device 202 is illustrated as an ohmmeter 202 arranged to measure a resistance of the charging switch unit 104. However, the resistance may also be determined by measuring parameters such as current, voltage and/or temperature as illustrated by the voltmeter 300, current meter 302 and temperature sensing unit 304 of FIG. 3. In the present description it is assumed that the resistance of the wiring to and from the charging switch unit 104 is substantially constant, and that a notable change in resistance is due to a change in the charging switch unit 104, and in particular due to heating of the charging switch unit 104.

The voltmeter 300, the current meter 302 and/or the temperature sensing unit 304 may be integrated in the charging switch unit 104, but it would also be possible to provide them separately from the charging switch unit 104. The current meter 202 in particular could be positioned anywhere between the charging port 108 and the energy storage 102 as long as it is possible to measure the current in each current path through a charging switch unit 104a-d. If the relationship between the temperature of and current through the charging switch unit 104 is known, it is sufficient to measure the temperature in each charging switch unit 104a-d. The relationship between current and temperature may for example be based on a mathematical model or it may be known from a look-up table or the like which is based on empirical data. Accordingly, there are a number of different ways in which the resistance of the charging switch unit 104 can be determined.

Figure 3:
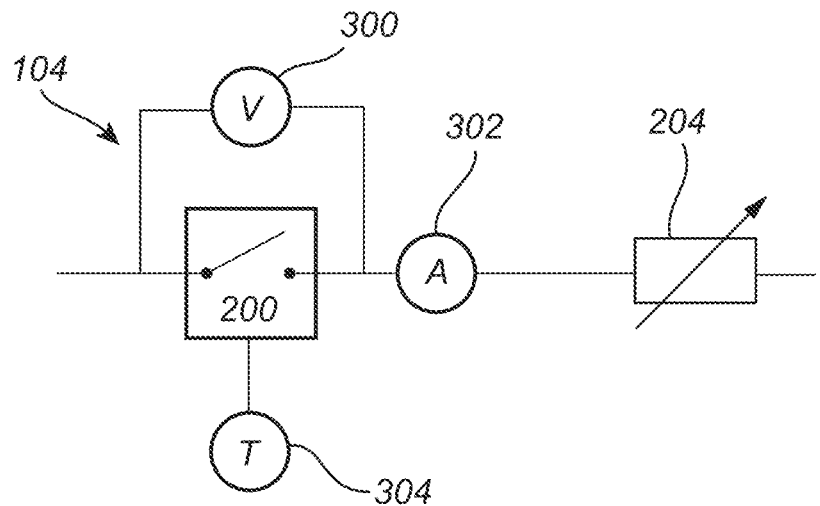
FIG. 3 is a schematic illustration of a charging switch unit of a charging system according to an embodiment of the invention.

FIGS. 2 and 3 further illustrate a variable resistor 204 which may be integrated in the charging switch unit 104 or arranged separately from the charging switch unit 104 anywhere in a current path between the common charging port 108 and the energy storage 102. The variable resistor may be embodied in many different ways known to the skilled person.

Moreover, the charging system comprises a charging control unit 116 connected to each of the charging switch units 104a-d. The control unit 116 may include a microprocessor, microcontroller, programmable digital signal processor or another programmable device. The control unit 116 may also, or instead, include an application specific integrated circuit, a programmable gate array or programmable array logic, a programmable logic device, or a digital signal processor. Where the control unit 116 includes a programmable device such as the microprocessor, microcontroller or programmable digital signal processor mentioned above, the processor may further include computer executable code that controls operation of the programmable device. The functionality of the control unit may also be distributed over a plurality of control units, or electronic control units (ECUs).

The charging control unit 116 is configured to, if an estimated difference in resistance between any two of the plurality of current paths is higher than a predetermined difference threshold value, control the variable resistor 204 of a charging switch unit 104a-d in the current path having the lowest resistance to increase the resistance of that current path. The current path is here described as a path from the common charging port 108, through one charging switch unit 104a-d and to the energy source. It should be noted that in an implementation having a different system configuration, the current path may be described as a path from the input port 104a-d to a corresponding output port 110a-d of the charging switch unit 104a-d.

Figure 4:
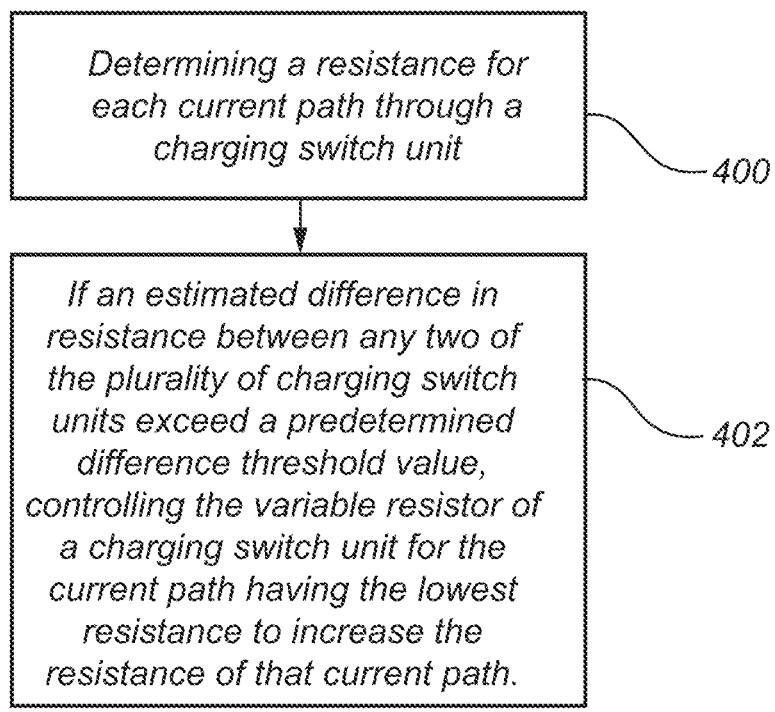
FIG. 4 is a flow chart outlining steps of a method according to an embodiment of the invention.

FIG. 4 is a flow chart outlining the general steps of an embodiment of a method of controlling the charging system 100 according to an embodiment of the invention. The method comprises determining 400 a resistance for each current path through a charging switch unit 104a-d; and if an estimated difference in resistance between any two of the plurality of current paths through charging switch units 104a-d is higher than a predetermined difference threshold value, controlling 402 the variable resistor 204 of a charging switch unit 104a-d for the current path having the lowest resistance to increase the resistance of that current path. The method can be performed by the control unit 116 of the charging system 100.

Figure 5:
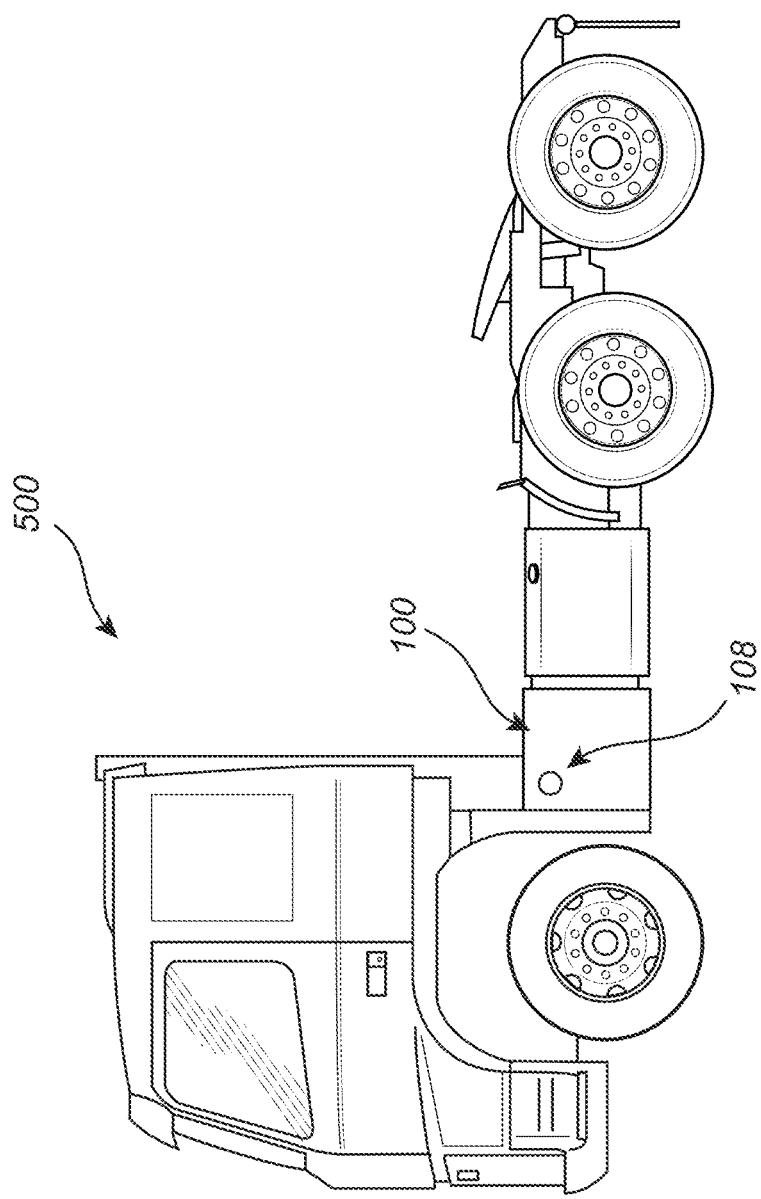
FIG. 5 is a schematic illustration of a vehicle comprising a charging system according to an embodiment of the invention.

FIG. 5 schematically illustrates a truck 500 comprising a charging system 100 according to any of the aforementioned embodiments. The vehicle 400 is equipped with an externally accessible charging port 108 for connecting the charging system to a charging station or any other energy source capable of charging the vehicle battery.

It is to be understood that the present invention is not limited to the embodiments described above and illustrated in the drawings; rather, the skilled person will recognize that many changes and modifications may be made within the scope of the appended claims.

The invention claimed is:

1. A charging system for an energy storage in a vehicle comprising:

a plurality of parallelly arranged charging switch units, each charging switch unit having an input terminal configured to be connected to a common charging port, and an output terminal configured to be connected to the energy storage, wherein each charging switch unit comprises a contactor configured to control a flow of current from the charging port to the energy storage;

for each charging switch unit, a measurement device configured to determine a parameter indicative of a resistance in a current path through the charging switch unit, and a variable resistor configured to control the resistance in the current path; and a charging control unit connected to each of the charging switch units and configured to, if an estimated difference in resistance between any two of the plurality of current paths through a charging switch unit is higher than a predetermined difference threshold value, control the variable resistor of a charging switch unit in the current path having the lowest resistance to increase the resistance of that current path.

2. The charging system according to claim 1, wherein the measurement device configured to determine a parameter indicative of a resistance is a current meter or a voltage meter.

3. The charging system according to claim 1, wherein the measurement device configured to determine a parameter indicative of a resistance is a temperature sensor configured to determine a temperature of the charging switch unit.

4. The charging system according to claim 1, wherein the charging control unit is further configured to control the variable resistor to reduce the current through any charging switch unit having a temperature above a predetermined threshold temperature.

5. The charging system according to claim 1, wherein the charging control unit is further configured to control the variable resistor of a charging switch unit only if a current through the charging switch unit is above a predetermined current threshold value.

6. The charging system according to claim 1, wherein the charging control unit is further configured to determine a resistance for each current path through a charging switch unit, and if a resistance in any one current path is deviating from resistances in other current paths by more than a predetermined resistance threshold value, to control the variable resistor in the one or more current path with the deviating resistance to equalize the resistance for all current paths.

7. The charging system according to claim 6, wherein the charging control unit is further configured to select a resistance of one current path as a reference resistance and to compare resistances in the other current paths with the reference resistance.

8. A vehicle comprising a charging system according to claim 1.

9. A method for controlling a charging system in a vehicle, the charging system comprising a plurality of parallelly arranged charging switch units, each charging switch unit having an input terminal configured to be connected to a common charging port, and an output terminal configured to be connected to an energy storage, wherein each charging switch unit comprises a contactor configured to control a flow of current from the charging port to the energy storage and a variable resistor configured to control the resistance in a current path through the charging switch unit, wherein the method comprises:

determining a resistance for each current path through a charging switch unit; and if an estimated difference in resistance between any two of the plurality of charging switch units is higher than a predetermined difference threshold value, controlling the variable resistor of a charging switch unit for the current path having the lowest resistance to increase the resistance of that current path.

10. The method according to claim 9, wherein determining a resistance comprises determining a current through and a voltage over the charging switch unit, and calculating the resistance based on the voltage and current.

11. The method according to claim 9, wherein determining a resistance comprises determining a temperature of the charging switch unit and determining the resistance based on a known relationship between the temperature and resistance for the charging switch unit.

12. The method according to claim 9, further comprising controlling the variable resistor to reduce the current in any charging switch unit having a temperature above a predetermined threshold temperature.

13. The method according to claim 9, further comprising controlling the variable resistor of a charging switch unit having the lowest resistance to increase the resistance for that current path only if the current in the current path having the lowest resistance is above a current threshold value.

14. The method according to claim 9, further comprising:

determining a resistance for each current path through a charging switch unit; and if a resistance in any one current path is deviating from resistances in other current paths by more than a predetermined threshold value, controlling the variable resistor in the one or more current path with the deviating resistance to equalize the resistance for all current paths.

15. The method according to claim 14, further comprising selecting a resistance of one current path as a reference resistance and comparing resistances in the other current paths with the reference resistance.

* * * * *